United States Patent [19]

Davey

[11] 4,315,179

[45] Feb. 9, 1982

[54] DOUBLE LAYERED STATOR PERIPHERAL END WINDINGS

[75] Inventor: Kent R. Davey, College Station, Tex.

[73] Assignee: Westinghouse Electric Corp., Pittsburgh, Pa.

[21] Appl. No.: 139,079

[22] Filed: Apr. 10, 1980

[51] Int. Cl.³ .............................................. H02K 3/00
[52] U.S. Cl. ..................................... 310/184; 310/201
[58] Field of Search .............................. 310/179–208, 310/260, 270

[56] References Cited

U.S. PATENT DOCUMENTS

| 268,205 | 11/1882 | Edison | 310/201 |
| 1,849,263 | 3/1932 | Apple | 310/180 X |
| 2,474,891 | 7/1949 | Davis | 310/180 |
| 3,413,717 | 12/1968 | Peters | 310/184 X |
| 3,427,488 | 2/1969 | Terry, Jr. | 310/194X |

FOREIGN PATENT DOCUMENTS 964286  7/1964  United Kingdom ............... 310/201

*Primary Examiner*—Mark O. Budd
*Attorney, Agent, or Firm*—W. D. Lanyi

[57] ABSTRACT

A dynamoelectric machine having two radial layers of connector ring segments arranged in the end regions of its stator. Each connector ring segment joins two coil sides embedded within circumferentially separated stator slots. Each double radial layer of connector ring segments is disposed at a discrete axial location with the connector ring segments being interspersed according to phase to minimize forces thereon.

5 Claims, 7 Drawing Figures

DOUBLE LAYERED STATOR PERIPHERAL END WINDINGS

BACKGROUND OF THE INVENTION

This invention relates to a dynamoelectric machine, and more particularly, to double radial layered connector ring segments which join stator slot embedded coil sides.

Large dynamoelectric machine designs have evolved which use stator windings of complex shape to handle the voltages and currents required by loads imposed on modern power generation systems. The large number of stator slots, the use of parallel windings in each phase, and multiple loop coils per phase necessitate the use of a complicated end connection scheme for electrically joining stator slot disposed coil sides into a stator winding. Such connection scheme conforms to a restricted space, provides rugged construction, and will also allow necessary connections between the stator coil sides.

The present solution to this problem consists of an end basket made by weaving together diamond-shaped coil sides. Each loop on the multiple coil loop is constructed from two coil sides each of which consists of a straight portion that extends the length of the stator slots and a complicated curved end turn portion at each end thereof. This end turn portion has a complex shape which bends axially, radially, and circumferentially. The manufacturing of the coil sides requires a complex three-dimensional form (typically of wooden construction) against which the copper coil sides are bent and twisted to form the turn portions. The stator coils sides are woven together to form the diamond end basket design for large dynamoelectric machines.

Disclosed in a copending continuation application by D. J. Scott having Ser. No. 57,048, filed on July 12, 1979, and assigned to the assignee of the present application, was a dynamoelectric machine having a stator winding constituting a plurality of coil loops each of which includes two straight coil sides which are embedded in and extend the entire length of the stator slots and protrude into the end regions. Each loop also has a generally C-shaped connector ring segment disposed in a first end region for connecting the two straight sides. The loops are joined in a predetermined manner according to phase by other connector ring segments disposed in the second end region. The connector ring segments are constructed of a material such as roebelled copper strands and hollow copper tubing, for example, and can be either water- or air-cooled.

Although the aforementioned connector ring segments were an improvement over the prior art diamond-shaped coil sides, a copending application by K. R. Davey, having Ser. No. 139,082, filed on Apr. 10, 1980 and having a common assignee with the present application, disclosed an arrangement of interspersing the connector ring segments by phases so as to drastically reduce the operational forces thereon. Further reductions in forces and losses incurred in the end turn regions were obtained from connecting selected top coil sides together and selected bottom coil sides together as disclosed in a copending application by K. R. Davey having Ser. No. 139,081, filed Apr. 10, 1980, and having a common assignee with the present application. In a copending application Ser. No. 57,048, filed on July 12, 1979, a dynamoelectric machine having insulated coil sides arranged in the stator's slots in a circumferentially side-by-side configuration was disclosed. The coil sides in each slot were, according to Scott's disclosure, separated circumferentially from each other by an insulated spacer.

Disclosed herein is a dynamoelectric machine having a stator winding which includes a plurality of multiloop stator coils each loop of which constitutes two straight coil sides which run the entire length of the stator slots and extends into the end regions of the stator. The stator winding also includes a plurality of connector ring segments disposed at each axial end of the stator which electrically connect each pair of coil sides and interconnect the separate loops into coils. The connector ring segments each have a circumferential body portion with a predetermined radius of curvature and a radial arm portion joined to each end thereof. A first group of connector ring segments is characterized by a relatively large radius of curvature and a second group of connector ring segments is characterized by a relatively small radius of curvature. The connector ring segments of the first group are arranged radially outside the connector ring segments of the second group.

The connector ring segments of each group are preferably axially interspersed according to phase to reduce operational forces thereon and losses within. The preferred embodiment of the present invention has radially adjacent connector rings of different phase to further reduce forces thereon. Commonly slotted coil sides arranged in circumferentially adjacent relationship are preferably employed with the previously described double (or more) radial layer connector ring segments. To avoid interference with retaining rings which are typically used on both ends of dynamoelectric machine rotors, the portions of the coil sides which extend into the end regions are directed to a radially outer position relative to the slots and the first and second connector ring groups' radial arms extend outwardly and inwardly, respectively, therefrom. Use of such multiple radial layers of connector ring segments reduces dynamoelectric machine length and copper usage while facilitating field repair of the coils.

Many other advantages and purposes of this invention will be clear from reading the following detailed description of the drawings.

DESCRIPTION OF THE PREFERRED EMBODIMENTS

Figure 1:
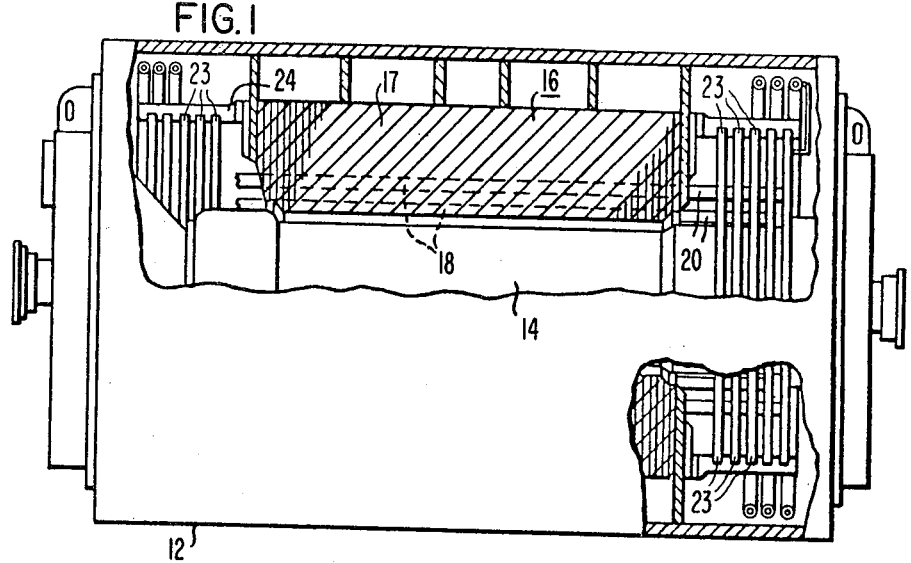
FIG. 1 is a partial sectional view of a dynamoelectric machine made in accordance with the present invention.

Referring now to the drawings in detail, FIG. 1 shows a partial sectional view of a dynamoelectric machine 10 having an outer casing 12, a rotor 14 and a stator structure 16 including stator core 17 having multiloop coils 18 disposed therein which together constitute a multiloop stator winding. Each loop of the multiloop coils includes two coil sides 20 which are embedded in the slots, not shown in FIG. 1, formed around the inner periphery of the stator core 17 and are joined by two groups of connector ring segments: the first group having annular, radially inner connector ring segments 22, not shown in FIG. 1, and the second group having annular radially outer connector ring segments 23. As described in detail below, these connector rings, 22 and 23, are connected to the coil sides 20 in such a way as to result in each of the connector rings having a different phase connection than the connector rings adjacent to it. This phase interspersion reduces electromotive forces on the connector ring segments. The connector ring segments are held in place by a plurality of mounting brackets 24. On each end of the stator structure 16 there are three parallel rings 26A, 26B, and 26C which constitute part of the machine's coolant system and are connected to the stator coils 18 by insulated tubing 28.

Figure 2:
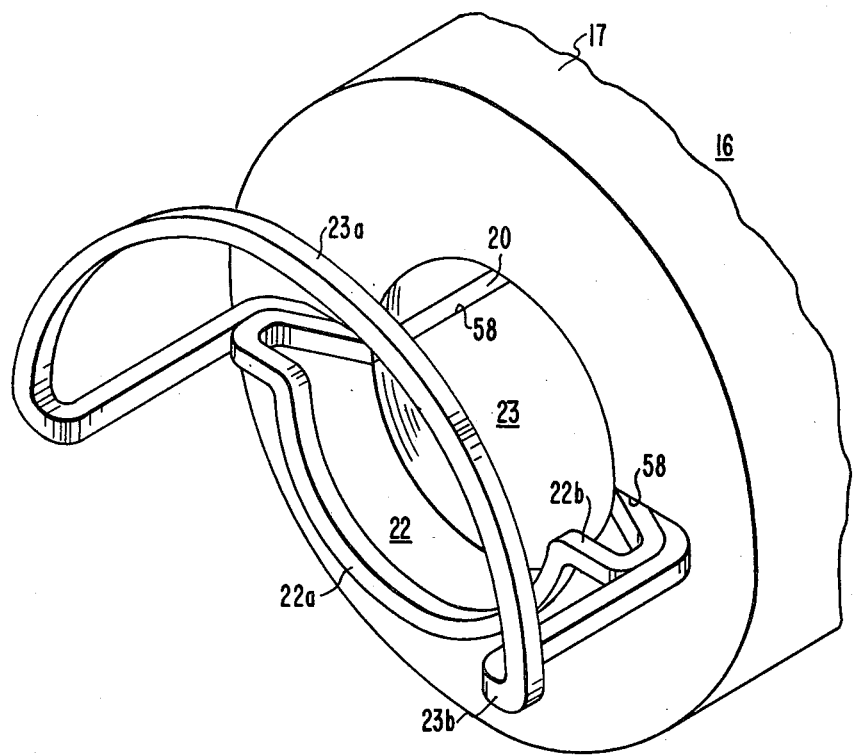
FIG. 2 is an enlarged pictorial view of one end of the dynamoelectric machine of FIG. 1 showing two radial layers of connector ring segments used in conjunction with commonly slotted, radially adjacent coil sides.
Figure 3:
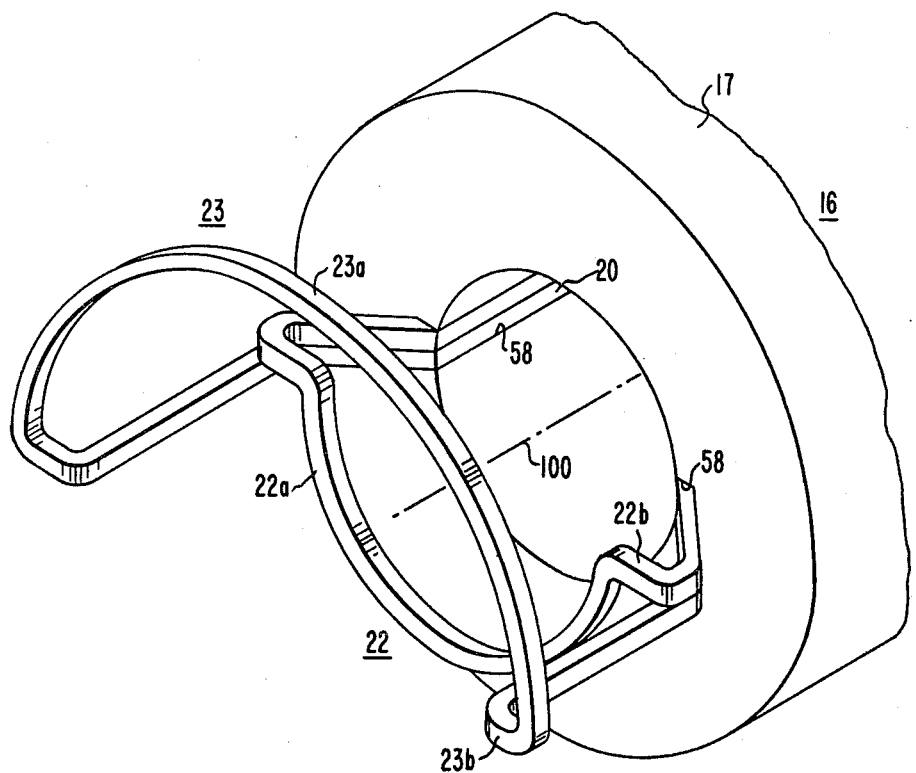
FIG. 3 is an enlarged pictorial view of one end of the dynamoelectric machine of FIG. 1 showing two radial layers of connector ring segments used in conjunction with commonly slotted, circumferentially adjacent coil sides.

FIG. 2 is an enlarged pictorial view of one end of stator structure 16 illustrating a radial disposition of coil sides 20 in stator slots 58 and their interconnection by the radially inner and outer connector ring segments. For purposes of clarity, only three stator slots 58 and four associated, connected coil sides 20 are shown in FIG. 2. While the illustrated coil sides 20 are arranged in the slots 58 to occupy radially inner (top) and outer (bottom) positions in each slot, it is to be understood that the preferable relative coil side disposition in each slot is circumferentially (side-by-side) adjacent as illustrated in FIG. 3, which will be described later in the application. Coil sides 20, in progressing axially beyond the end of stator core 17, protrude radially outwardly to a connection radius (for clearance of rotor retaining rings) and connect to radially outer connector ring segments 23 and radially inner connector ring segments 22. Inner and outer connector ring segments 22 and 23 have circular body portions 22a and 23a, respectively. Radial arm portions 22b and 23b respectively protrude radially inwardly and outwardly from the coil sides connection radius and constitute terminals for body portions 22 and 23, respectively. The double radial connector ring arrangement in combination with top and bottom coil side disposition, as illustrated in FIG. 2, necessitates top coil side connections everywhere. As such, two separate multiloop coils would result. Parallel connection of the two would cause large circulating currents, due to the unbalanced flux linkage. However, serially connecting the two would eliminate the undesirable circulating currents. It is to be further noted that connector ring segments 22 and 23 which are connected to commonly slotted coil sides 20 lie in separate axial planes.

FIG. 3 illustrates the preferred embodiment of the double radial layer connector ring segment arrangement that utilizes side-by-side coil side disposition in the stator slots 58 as disclosed in copending application Ser. No. 57,048, filed July 12, 1979 and assigned to the assignee of the present invention. As shown, the connector ring segments 22 and 23 join coil sides 20 which are disposed in circumferentially opposite sides of the slot. In other words, radially outer connector ring segment 23 connects coil sides 20 which are on the clockwise and counterclockwise sides of slots 58. Furthermore, the connector ring segments traverse stator core 17 in circumferential directions corresponding to the slot sides occupied by the coil sides to-be-connected. Upon exiting slots 58, coil sides 20 bend radially outwardly (better illustrated in FIG. 4A) to connection radius 25 as measured from stator axis 100. As shown in FIG. 3, radial arm portions 22b and 23b constitute terminals for both ends of connector ring segment body portions 22a and 23a, respectively. Radial arm portions 22b and 23b extend radially inwardly and outwardly, respectively, from connection radius 25 so as to provide a double radial layer of connecting ring segments. Furthermore, connector ring segments 22 and 23 are disposed at different axial locations from stator core 17 (23 is, by example, disposed axially further from core 17 than 22).

Figure 4B:
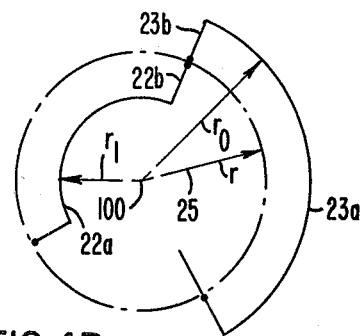
FIGS. 4A, 4B, and 4C are schematic diagrams respectively illustrating a side view of the dynamoelectric machine stator, one end of the machine's stator, and a pictorial representation.
Figure 4A:
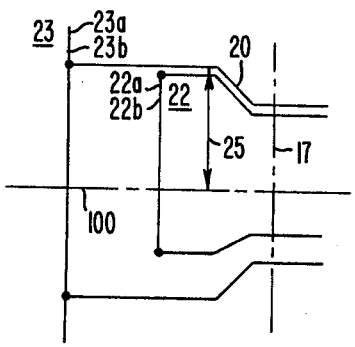
Figure 4C:
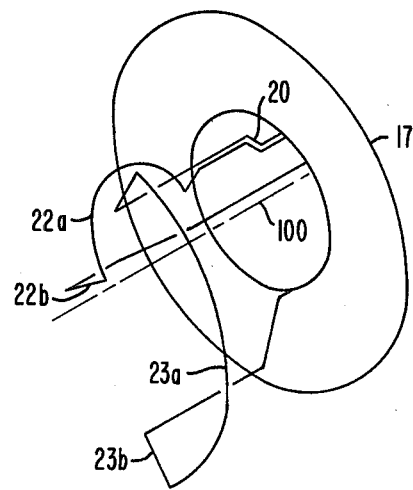

FIGS. 4A, 4B and 4C schematically illustrate the relative disposition of stator core 17, coil sides 20, and radially inner and outer connector ring segments 22 and 23. FIGS. 4A, 4B and 4C correspond to transverse, axial, and pictorial views respectively. As commonly slotted coil sides 20 axially exit their stator slot, they are simultaneously axially and radially displaced to the connection radius 25. Outer connector ring segment 23 is located axially nearer stator core 17 than is inner connector ring segment 22 to contrast FIGS. 4A, 4B, and 4C with FIGS. 2 and 3 and emphasize that inner and outer connector ring segments joined to commonly slotted coil sides 20 need only be disposed at different axial distances from stator core 17 to conform to the present invention's structure. As seen in FIGS. 4A, 4B, and 4C, circumferential body portion 23a has a radius of curvature $r_o$ which is greater than body portion 22a's radius of curvature $r_i$. Commonly slotted coil sides 20 are connected to circumferentially displaced coil sides 20 (as best illustrated in FIGS. 4B and 4C) which are distributed in separate slots. All connection radii and radii of curvature, previously mentioned, are measured from axis 100 which extends through bore 102 in stator structure 16. Only two connector ring segments 22 and 23 are shown, but it is to be understood that many such connector ring segments would typically be required wherein an outer ring 23 would be disposed in the same axial plane with the illustrated inner connector ring 22.

Figure 5:
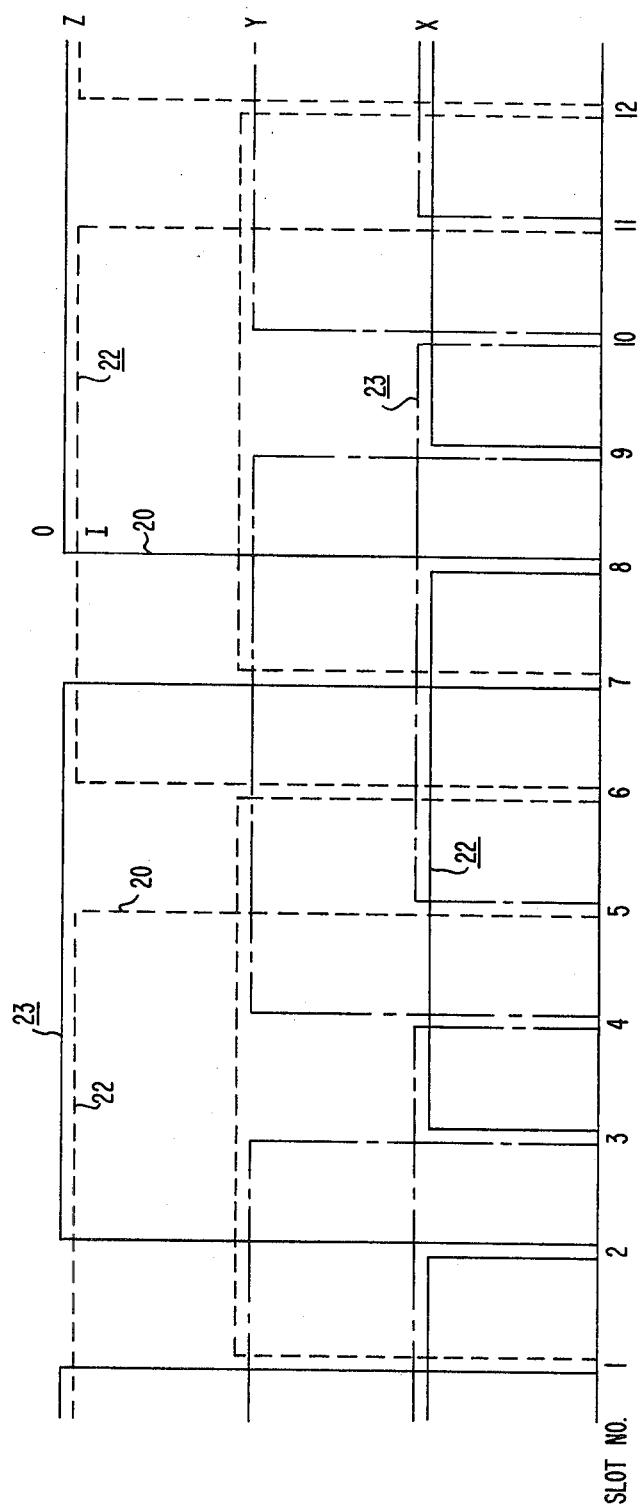
FIG. 5 is a schematic diagram of the stator winding for the dynamoelectric machine of FIG. 1.

FIG. 5 is a schematic diagram of one end of an exemplary structure 16 which has twelve slots therein. In addition to the slots, three axial planes (X,Y,Z) are indicated where connector rings 22 and 23 are disposed. As shown, an inner and an outer connector ring segment 22 and 23 are located at each axial plane. Commonly slotted coil sides 20 extend different distances in the axial direction and are joined to inner and outer connector ring segments which traverse stator core 17 in opposite circumferential directions. As disclosed in copending application having Ser. No. 139,082, filed Apr. 10, 1980, and being assigned to the assignee of the present invention, the operational forces acting on connector ring segments, when axially interspersed according to phase, are greatly reduced. The axially interspersed phase connector ring segments, taught by K. R. Davey in the aforementioned application, is practiced in the present invention in both the inner and outer connector ring segments. Furthermore, phase interspersal of connector ring segments is also provided in the radial direction at each axial plane. Such interspersal reduces forces on the connector ring segments even further. It is thus readily seen that identical phases do not occupy neighboring connector ring segment positions in the axial or radial directions.

It will now be apparent that an improved connector ring segment structure has been provided which yields a 10% decrease in coil cost, 14.5% decrease in utilizing machine length, simplified manufacture of the coil side connections, greatly improved coil serviceability, and decreased forces thereon with a concomitant reduction in bracing requirements. Futhermore, as previously stated, coil side distribution in the stator slots may be top-bottom (radial) or side-by-side (circumferential) may be used with the present invention with equal facility.

I claim:

1. A dynamoelectric machine comprising: a generally tubularly-shaped stator core having a plurality of slots formed in said core's inner periphery;
   a plurality of coil sides each of which is partially disposed in said stator slots and partially extends into the stator's end regions, each of said stator slots having at least two of said coil sides disposed therein;
   a first and second group of connector ring segments disposed in the stator's end regions for electrically joining said coil sides, the connector ring segments each having a circumferential body portion and two radial arm portions each of which is connected to one end of said body portion, the body portions of said first group having a greater radius of curvature than the body portions of said second group, said first group's connector ring segments being disposed radially outward from said second group's connector ring segments; and
   said first group's connector ring segments being axially interspersed according to phase and said second group's connector ring segments being axially interspersed according to phase.

2. The dynamoelectric machine of claim 1 wherein said first group's connector ring segments are disposed radially adjacent said second group's connector ring segments such that radially adjacent connector ring segments are of different phase.

3. The dynamoelectric machine of claim 1 wherein a plurality of said coil sides are arranged in each of said slots such that commonly slotted coil sides are circumferentially adjacent.

4. The dynamoelectric machine of claim 1 wherein said coil sides extend from said stator slots to a common radius relative to said stator's axis, said common radius being further from said axis than said slots.

5. The dynamoelectric machine of claim 4 wherein the radial arm portions of said first group extend radially outwardly from said common radius and said radial arm portions of said second group extend radially inwardly from said common radius to the respective body portions.

* * * * *